United States Patent
Rust et al.

(10) Patent No.: US 11,807,107 B2
(45) Date of Patent: Nov. 7, 2023

(54) VEHICLE SYSTEM AND LONGITUDINAL VEHICLE CONTROL METHOD

(71) Applicant: Anamnesis Corporation, San Francisco, CA (US)

(72) Inventors: Ian C. Rust, San Francisco, CA (US); Selina Pan, San Francisco, CA (US)

(73) Assignee: Anamnesis Corporation, San Francisco, CA (US)

(*) Notice: Subject to any disclaimer, the term of this patent is extended or adjusted under 35 U.S.C. 154(b) by 0 days.

(21) Appl. No.: 17/889,884

(22) Filed: Aug. 17, 2022

(65) Prior Publication Data

US 2023/0121191 A1    Apr. 20, 2023

Related U.S. Application Data

(60) Provisional application No. 63/233,936, filed on Aug. 17, 2021.

(51) Int. Cl.

| | |
|---|---|
| *B60L 15/20* | (2006.01) |
| *B60W 60/00* | (2020.01) |
| *B60W 30/18* | (2012.01) |
| *B60W 10/08* | (2006.01) |
| *B60W 10/18* | (2012.01) |
| *B60L 7/18* | (2006.01) |

(52) U.S. Cl.
CPC ............ *B60L 15/2009* (2013.01); *B60L 7/18* (2013.01); *B60W 10/08* (2013.01); *B60W 10/18* (2013.01); *B60W 30/18127* (2013.01); *B60W 60/001* (2020.02); *B60W 2300/145* (2013.01); *B60W 2510/18* (2013.01); *B60W 2520/10* (2013.01); *B60W 2552/15* (2020.02); *B60W 2710/08* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 2016/0009302 A1 | 1/2016 | Bryant et al. | |
| 2017/0015163 A1* | 1/2017 | Sielhorst | ................. B60D 1/62 |
| 2018/0364738 A1 | 12/2018 | Bridges | |

(Continued)

*Primary Examiner* — Todd Melton
*Assistant Examiner* — Jason R Roberson
(74) *Attorney, Agent, or Firm* — Jeffrey Schox

(57) ABSTRACT

The vehicle control method can include: determining a vehicle state based on a set of vehicle state inputs; determining a command based on the vehicle state; and controlling the vehicle according to the command. The method can optionally include updating a vehicle model based on a control outcome. However, the method S100 can additionally or alternatively include any other suitable elements. The method can function to determine longitudinal vehicle control based on a set of vehicle state inputs (e.g., a limited set of inputs—such as without direct knowledge of a throttle input, etc.). Additionally or alternatively, the vehicle control method can function to infer driving intent based on vehicle state measurements and/or translate inferred driving intent into low-latency vehicle control. Additionally or alternatively, the system can function to autonomously augment longitudinal propulsion, autonomously augment vehicle braking, and/or facilitate autonomous (longitudinal) vehicle control.

10 Claims, 10 Drawing Sheets

(56) References Cited

U.S. PATENT DOCUMENTS

| | | |
|---|---|---|
| 2020/0018635 A1 | 1/2020 | Reichow et al. |
| 2020/0101950 A1 | 4/2020 | Tiwari et al. |
| 2020/0175786 A1 | 6/2020 | Bongers et al. |
| 2020/0210726 A1 | 7/2020 | Yang et al. |
| 2020/0294401 A1 | 9/2020 | Kerecsen |
| 2020/0324763 A1 | 10/2020 | Switkes et al. |
| 2022/0017161 A1 * | 1/2022 | Layfield .................. B60D 1/30 |

* cited by examiner

VEHICLE SYSTEM AND LONGITUDINAL VEHICLE CONTROL METHOD

CROSS REFERENCE TO RELATED APPLICATIONS

This application claims the benefit of U.S. Provisional Application No. 63/233,936, filed 17 Aug. 2021, which is incorporated herein in its entirety by this reference.

TECHNICAL FIELD

This invention relates generally to the transportation field, and more specifically to a new and useful electric vehicle system and/or control method in the transportation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
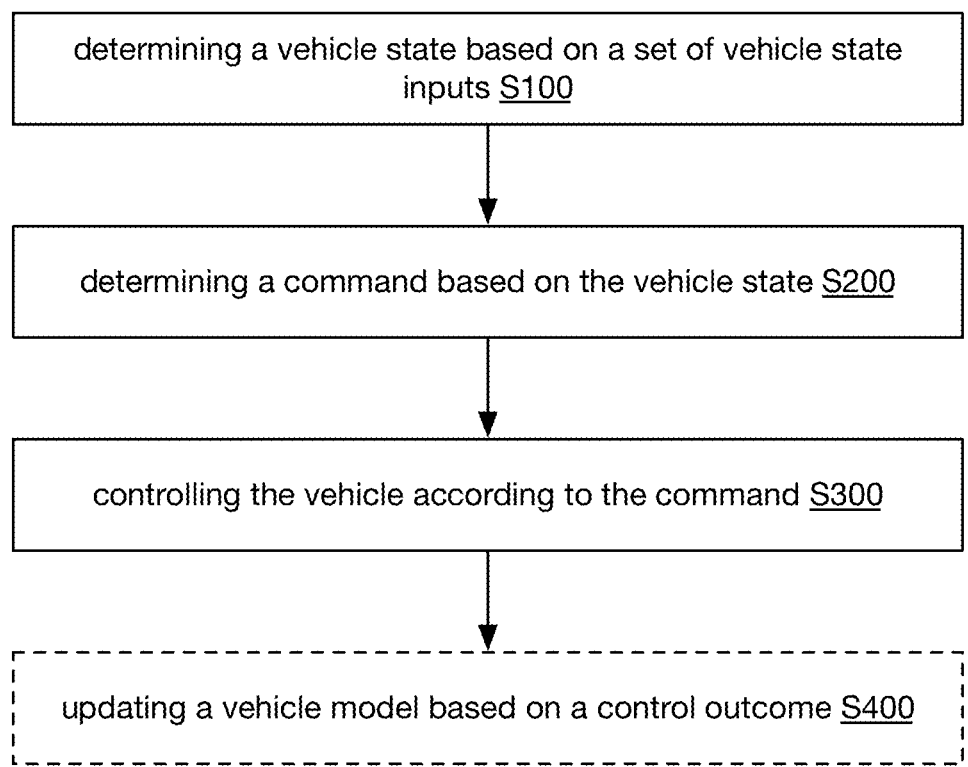
FIG. 1 is a flowchart diagram representation of a variant of the method.

The vehicle control method, an example of which is shown in FIG. 1, can include: determining a vehicle state based on a set of vehicle state inputs S100; determining a command based on the vehicle state S200; and controlling the vehicle according to the command S300. The method can optionally include updating a vehicle model based on a control outcome S400. However, the method S100 can additionally or alternatively include any other suitable elements. The method can function to determine longitudinal vehicle control based on a set of vehicle state inputs (e.g., a limited set of inputs—such as without direct knowledge of a throttle input, etc.). Additionally or alternatively, the vehicle control method can function to infer driving intent based on vehicle state measurements and/or translate inferred driving intent into low-latency vehicle control. Additionally or alternatively, the system can function to autonomously augment longitudinal propulsion, autonomously augment vehicle braking, and/or facilitate autonomous (longitudinal) vehicle control.

The vehicle control method can be used with and/or deployed onboard a vehicle system 100 which can include: a set of vehicle couplings 110 (e.g., defining a tractor interface, a trailer interface, etc.); a chassis 120, a battery pack 130, an electric powertrain 140, a sensor suite 150, and a controller 160, and/or any other suitable set of components. The vehicle system functions to structurally support and/or tow a trailer—such as a Class 8 semi-trailer—and/or to augment/supplement a tractor propulsive capability (e.g., via a diesel/combustion engine) with a supplementary electric drive axle(s). In variants, the vehicle system can be classified/certified as a converter dolly, a tractor (or secondary tractor), and/or under another vehicle classification.

In variants, the vehicle control method can be used in conjunction with and/or deployed to control the vehicle system(s) as described in U.S. application Ser. No. 17/849,003, filed 24 Jun. 2022, which is incorporated herein in its entirety by this reference.

The term "vehicle state" as utilized herein can refer to a current vehicle state estimate, a temporal window of historical vehicle states (e.g., up to present/current vehicle state estimate), a prediction (e.g., as a function of time; current vehicle trajectory), and/or any combination thereof. Likewise, the term trajectory can refer to a prediction of a full vehicle state estimate or a subset of vehicle state parameters thereof (e.g., velocity and/or longitudinal force at a vehicle coupling; a velocity prediction and/or a longitudinal force prediction; etc.). In variants, the term "vehicle trajectory" may be used in reference specifically to longitudinal parameters (e.g., a longitudinal vehicle trajectory; considering only longitudinal forces, accelerations, velocity changes, etc.), but can additionally or alternatively refer to a 2D vehicle trajectory (e.g., longitudinal and lateral state estimation and/or prediction), a 3D vehicle trajectory, and/or any other suitable vehicle trajectory. However, the term "vehicle state" and/or "trajectory" can be otherwise used or suitably referenced herein.

2. Benefits.

Variations of the technology can afford several benefits and/or advantages.

First, variations of this technology can enable aftermarket trucking electrification with minimal (e.g., zero) hardware installations or retrofits on a tractor and/or trailer. In such variants, the vehicle system can be attached at the fifth wheel of the tractor and connect to the trailer at a secondary fifth wheel (a.k.a. 'sixth wheel') between the tractor and the trailer, providing at least one intervening electric drive axle between the tractor and trailer. The electric powertrain of the vehicle system can provide electric arbitrage, as electric propulsion is cheaper per usable watt and can lower maintenance costs (e.g., by reducing load on the expensive-to-maintain diesel engine of the tractor, by reducing frictional brake wear, etc.).

Second, variations of the technology can be used to provide torque augmentation for a diesel engine, which can improve vehicle acceleration performance, such as when employed in conjunction with an undersized tractor engine (e.g., small engine, etc.). In such variants, the battery of the vehicle system can effectively replace combustibles as the primary functional power source used to tow a trailer.

Third, variations of the technology can provide robust longitudinal vehicle control and/or maintain control stability. As an example, variations of the technology can be seen as translating 'driving intent' into low latency vehicle control (e.g., impedance control or an expanded form thereof; admittance control), which can improve the driving 'feel' of the system. In some cases, the feeling of low latency acceleration and/or deceleration responses can be particularly desirable to some drivers, and may generally improve the driving experience for semi-tractors towing a payload. In variants, the vehicle system and/or control method can operate without direct communication with primary vehicle propulsion systems (e.g., tractor engine, tractor CAN bus, ECU, EBS, etc.). Additionally or alternatively, the system and/or vehicle control method can provide robust vehicle control while relying partially or entirely on measurements of downstream effects (e.g., motions/forces) resulting from separate (parallel) control of a dynamic vehicle system.

Fourth, variations of the technology can enable intuitive operation by accommodating the complexities of a dynamic (combination vehicle) system. In examples, technology can accommodate for the complexities of a system wherein the sensing and main propulsive components (e.g., the electric powertrain) are arranged between (and interfaces between) a driven tractor and a payload. In this configuration, electric powertrain actuation directly changes the measured force (at both the tractor and trailer interfaces). The electric powertrain can leverage the method described herein to contribute to and/or 'follow' accelerations of the tractor, without propagating the dynamics of the trailer forward to the tractor. As an example, driving the tractor may 'feel' as if it is towing a lighter payload, as if it has a larger engine (and/or more responsive brakes), and/or provide any other suitable driving experience. Likewise, the electric powertrain can mitigate one or more dynamic effects of the tractor/trailer system (e.g., rolling resistance; aerodynamic drag; gravitational resistance of hills, interchangeably referenced herein as road grade contribution to resistance and/or longitudinal component of weight, etc.), while dynamically accommodating for accelerations and/or decelerations at the driver's behest.

However, variations of the technology can additionally or alternately provide any other suitable benefits and/or advantages.

3. System.

Figure 5:
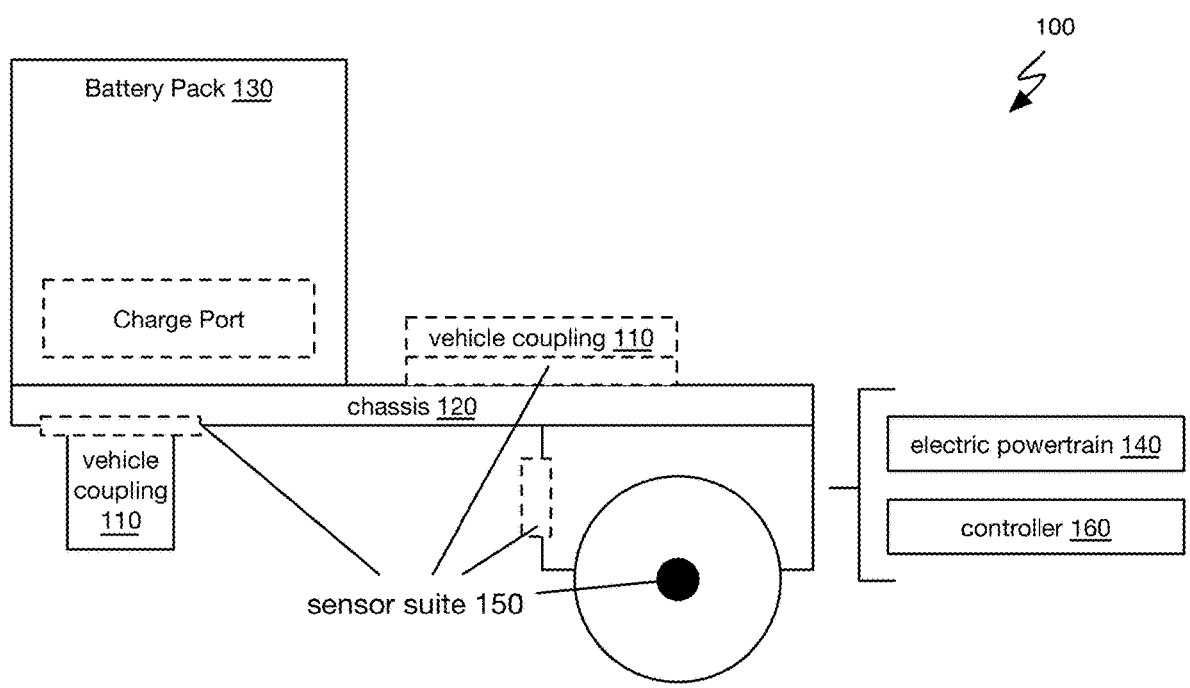
FIG. 5 is a schematic diagram of a variant of the vehicle system.

The vehicle system 100, an example of which is shown in FIG. 5, can include: a set of vehicle couplings 110 (e.g., defining a tractor interface, a trailer interface, etc.); a chassis 120, a battery pack 130, an electric powertrain 140, a sensor suite 150, and a controller 160, and/or any other suitable set of components. The vehicle system functions to structurally support and/or tow a trailer—such as a Class 8 semi-trailer—and/or to augment/supplement a tractor propulsive capability (e.g., via a diesel/combustion engine) with a supplementary electric drive axle(s). In variants, the vehicle system 100 can be the vehicle system(s) as described in U.S. application Ser. No. 17/849,003, filed 24 Jun. 2022, which is incorporated herein in its entirety by this reference.

The vehicle system 100 is preferably a land vehicle and more preferably road vehicle (roadway vehicle), but can additionally or alternatively be an off-road vehicle, rail vehicle, and/or any other suitable type of vehicle. Additionally or alternatively, the vehicle system can include or be used with a semi-truck (e.g., Class 8 tractor), a trailer, and/or any other suitable vehicle(s). In a first example, the vehicle system 100 is a roadway electric vehicle (EV) system configured to connect between a semi-tractor and a trailer. In a second example, the vehicle system 100 can be an electrified converter dolly. In a third example, the vehicle system 100 can be an autonomous EV (e.g., configured to independently maneuver, configured to autonomously control the electric powertrain, etc.).

In a specific example, the vehicle system can be a roadway electric vehicle (EV) system configured to connect between a semi-tractor and a trailer, and can include: a chassis defining a longitudinal axis; a kingpin configured to couple the chassis to a fifth wheel of the semi-tractor; a sensor platform connecting the kingpin to the chassis, the sensor platform comprising a first sensor configured to measure a longitudinal force between the kingpin and the chassis; a secondary fifth wheel mounted to the chassis and configured to couple the trailer to the chassis; an electric drivetrain including: a traction motor and a steering drive axle; a battery system comprising a set of battery cells and optionally a charge port; and optionally a set of extendable landing gear (e.g., a set of front wheels) mounted to the chassis forward of the steering drive axle, wherein the extendable landing gear is operable between an extended mode (e.g., when the roadway EV system is disconnected from the semi-tractor) and a retracted mode (e.g., when the roadway EV system is connected to the semi-tractor).

Each of the set of vehicle couplings 110 can function to couple, hitch, and/or connect the vehicle system to an adjacent vehicle, such as a tractor or trailer, along a respective mechanical interface. Additionally or alternatively, the set of vehicle couplings are preferably configured to transfer forces (e.g., longitudinal forces) between the vehicle system and the adjacent vehicle (e.g., tractor; trailer; etc.) to facilitate traversal.

The set of vehicle couplings can include: a fifth wheel (hitch), a kingpin, a trailer hitch, a pintle hitch coupling, a receiver hitch, a gooseneck hitch, a towing/trailing portion of one of the aforementioned couplings, and/or any other suitable set of vehicle coupling(s).

Figure 2:
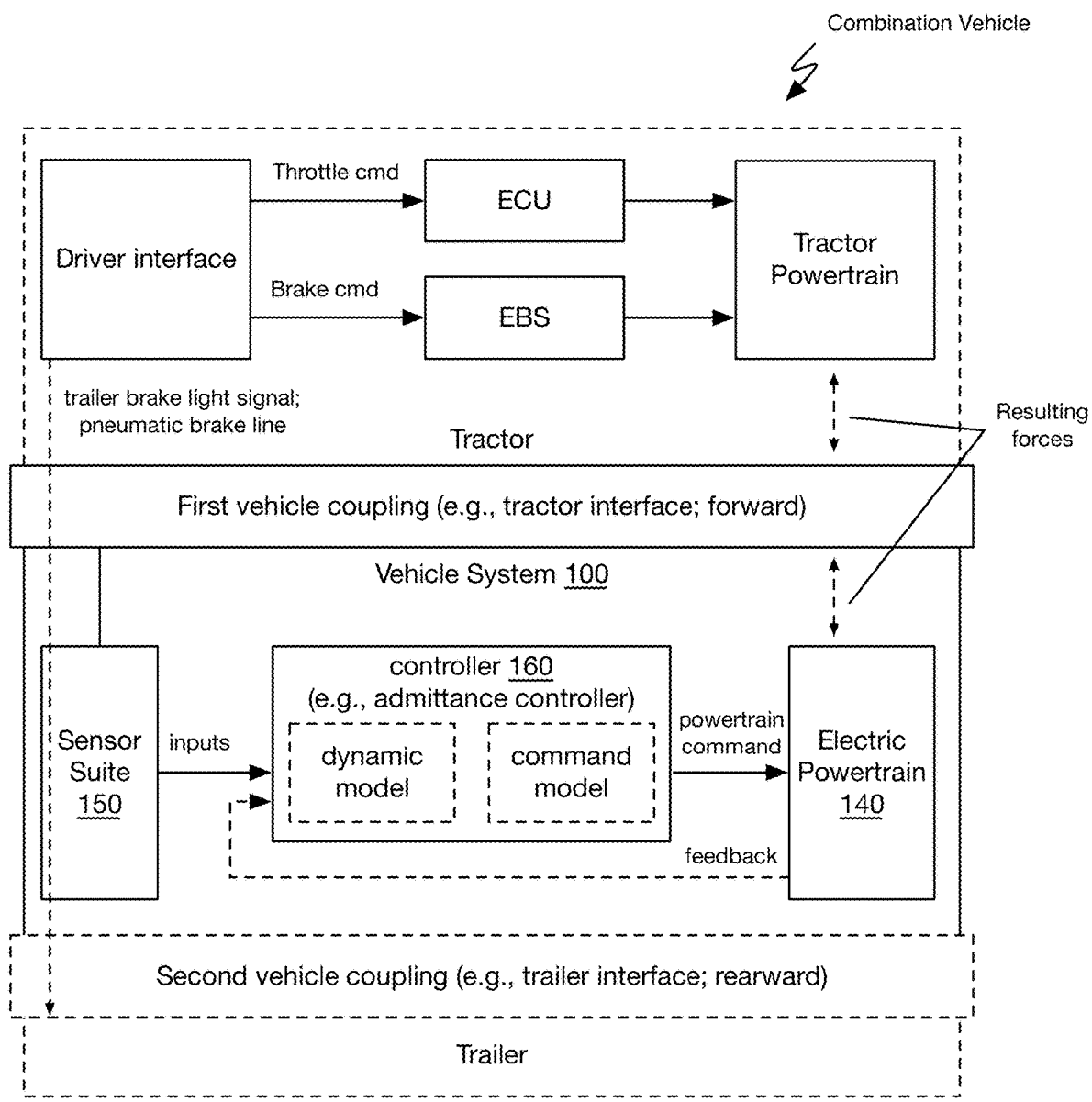
FIG. 2 is a diagrammatic example of a variant of the vehicle system (and/or vehicle control method) when employed in a combination vehicle.

In one set of variants (e.g., an example is shown in FIG. 2), the set of vehicle couplings can include and/or define a first mechanical interface at a leading end relative to a longitudinal axis of the vehicle which is configured to connect to a tractor (e.g., a.k.a., a tractor interface) and a second mechanical interface at a trailing end relative to a longitudinal axis of the vehicle which is configured to connect to a trailer (a.k.a., a trailer interface).

The tractor interface functions to mechanically connect the vehicle system to a tractor (an example is shown in FIG. 2). The tractor interface is preferably configured to be hitched directly to a standard fifth wheel coupling of a tractor, however the tractor interface can additionally or alternatively be indirectly connected to the tractor—such as by way of an intervening instance of the vehicle system (e.g., chained together), intervening trailer (e.g., for a road train, an example is shown in FIGS. 9A-C), and/or any other suitable intervening hardware. The tractor interface is preferably rotatable (e.g., bolster-bowl in conjunction with a shear interface, kingpin), but can additionally or alternatively be fixed/rigid (e.g., constrained in six degrees freedom of rigid body motion). In a first example, the tractor interface is a kingpin. In a second example, the tractor interface can be configured to connect to a converter dolly.

In variants—such as when the vehicle system may be classified as a converter dolly—the tractor interface can include and/or be used with a drawbar (e.g., to meet regulatory/certification standards). In a first example, the front end of the chassis and a kingpin can be a drawbar. The drawbar can be configured to bear vertical loads (e.g., 10 k-40 k lbs, support a vertical load based on the mass of the trailer, etc.) and/or can be configured to transfer pitch moments between the tractor and the vehicle system. However, the drawbar can additionally or alternatively be (vertically) unloaded. However, the tractor interface and vehicle system can alternatively exclude a drawbar.

However, the system can include any other suitable tractor interface.

The trailer interface functions to mechanically connect the system to a trailer (an example is shown in FIG. 2). The trailer interface includes a secondary fifth wheel (hereinafter interchangeable with 'sixth wheel'), which is configured to engage the kingpin of a trailer. The trailer interface and/or the engagement surface of the sixth wheel (e.g., upper surface) thereof is preferably arranged substantially in parallel with the tractor interface (e.g., upper engagement surface of the tractor fifth wheel and/or lower engagement surface of kingpin connection), however can additionally or alternatively be substantially planar with the tractor interface, within a predetermined height offset of the tractor interface (e.g., less than six inches), within a predetermined skew angle, and/or otherwise arranged relative to the tractor interface.

In a specific example, a first vehicle coupling defines an inferior contact surface (e.g., a trailer interface) and a horizontal reference plane six inches above the inferior contact surface and a second vehicle coupling (e.g., trailer interface) is mounted below the horizontal reference plane.

However, the system can include any other suitable trailer interface.

The chassis 120 functions to mount the battery pack and the electric powertrain and additionally or alternatively can function to transmit structural loads between any subset(s) of: the tractor interface, the trailer interface, and/or the wheels/electric powertrain (an example is shown in FIGS. 7A-B). However, the vehicle system can include any other suitable chassis.

The vehicle system can include a battery pack 130, which functions to store electrochemical energy in a rechargeable manner and/or functions to supply electrical energy to the electric powertrain. The electric vehicle can include: one battery pack per vehicle axle, one battery pack per motor controller, one battery pack per motor, a single battery pack for the electric vehicle, multiple (redundant) battery packs (e.g., 2 duplicative battery packs, more than 2, etc.) and/or any other suitable number of battery packs. In a specific example, there can be a single battery pack arranged vertically above the fifth wheel coupling at the tractor interface. In a second example, there can be a rear battery pack arranged proximal to a driven axle and/or below the sixth wheel (e.g., secondary fifth wheel coupling), which may provide increased traction at the wheels of the driven axle.

However, the vehicle system can include any other suitable battery pack.

The vehicle system can include an electric powertrain 140, which functions to generate electromotive force at the motor(s) and to convert this force into torque at the wheels. The electric powertrain can include: an electric motor, a transmission, a set of wheels. The electric powertrain can optionally include frictional brakes. However, the vehicle system can include any other suitable powertrain. The electric powertrain can include a single motor or multiple motors: per wheel (or hub), per axle, per chassis, and/or with any other suitable number of motors. The transmission and/or powertrain is preferably configured to independently and/or separately rotate the left and right wheels (and/or wheel rotors), however the wheels can additionally or alternatively be mechanically linked and/or actuated by a single mechanism or mechanical connection. However, the system can include any other suitable powertrain.

However, the vehicle system can include any other suitable suspension.

The sensor suite 150 functions to monitor vehicle state parameters which can be used for vehicle control (e.g., autonomous vehicle control, powertrain control). The sensor suite can include: fifth/sixth wheel instrumentation stage sensors (e.g., load cells, strain gages, etc.), internal sensors (e.g., force sensors, accelerometers, magnetometer, gyroscopes, IMU, INS, temperature, voltage/current sensors, etc.), diagnostic sensors (e.g., cooling sensors such as: pressure, flow-rate, temperature, etc.; BMS sensors; tractor/trailer inter-connection sensors or passthrough monitoring, etc.), location sensors (e.g., GPS, GNSS, triangulation, trilateration, etc.), wheel encoders, cameras, temperature sensors, voltage/current sensors, environmental sensors (e.g., cameras, temperature, wind speed/direction, barometers, air flow meters), guidance sensors (e.g., sonar, lidar, radar, cameras, etc.), cameras (e.g., CCD, CMOS, multispectral, visual range, hyperspectral, stereoscopic, etc.), spatial sensors, touch sensors (e.g., resistive, capacitive, etc.), proximity sensors, and/or any other suitable sensors. Sensors of the sensor suite can be arranged: onboard the (autonomous) vehicle system, integrated into a vehicle coupling (e.g., at an instrumentation state of a tractor or trailer interface, etc.), integrated into the powertrain, mounted to the chassis, and/or can be otherwise suitably arranged. Sensors can be internal sensors (e.g., IMU, INS, GPS, etc.), external facing (e.g., perception sensors), onboard the vehicle, and/or can be otherwise configured. In variants, the sensor suite can include remote sensors arranged offboard the vehicle (e.g., tractor mounted sensors, trailer mounted sensors, etc.), but can alternatively be entirely onboard the vehicle (e.g., exclude any tractor mounted sensors and/or tractor communications, etc.). However, the vehicle system can include any other suitable sensors.

Figure 8A:
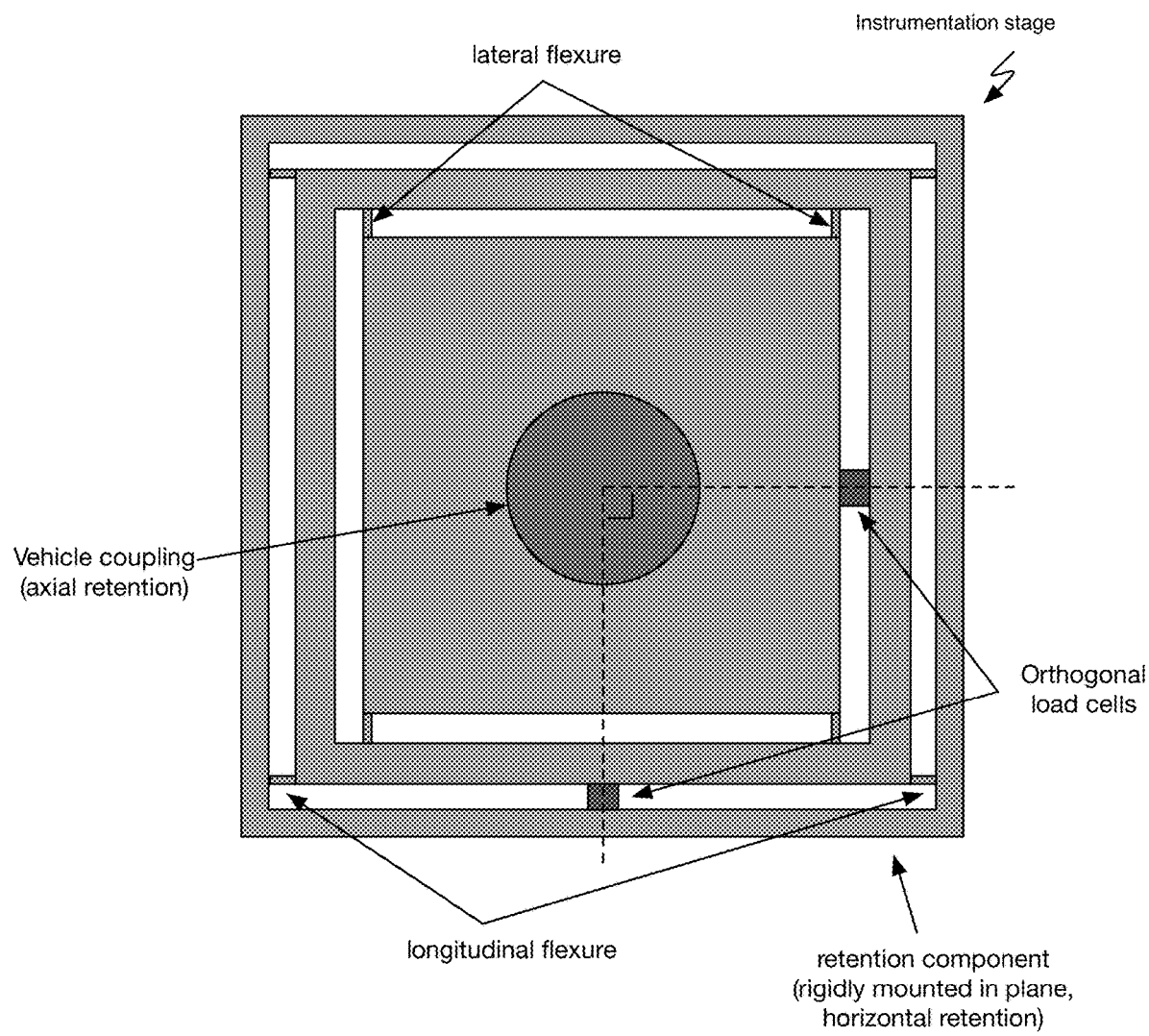
FIG. 8A is a top view illustration of a first example instrumentation stage configured to measure longitudinal force in a variant of the method.
Figure 8B:
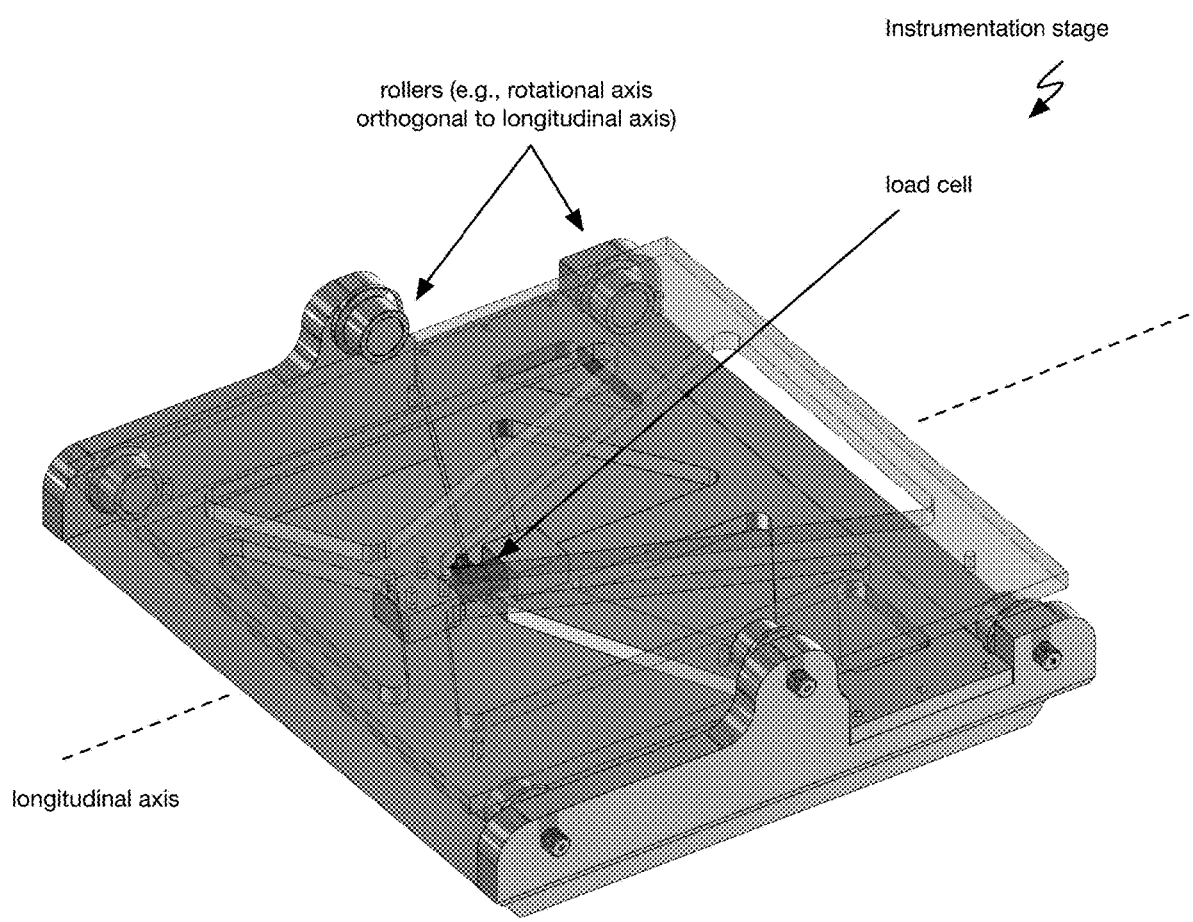
FIG. 8B is a partially-translucent isometric view of a second example instrumentation stage configured to measure longitudinal force in a variant of the method.

In variants, the tractor and/or trailer interfaces can include an instrumentation stage (examples are shown in FIGS. 8A-B) between the fifth wheel coupling (e.g., tractor side, trailer side) and the chassis which houses load sensors of the sensor suite. Preferably, there is an instrumentation stage connected to at least one of the tractor and trailer interfaces, but the vehicle system can additionally or alternatively include an instrumentation stage at both interfaces and/or altogether neglect an instrumentation stage within the vehicle system (e.g., in variants where control relies primarily upon control inputs from the tractor).

The instrumentation stage functions to measure force transmission between components engaged at the interface (e.g., force transmission across the fifth wheel coupling; longitudinal force transmission aligned with a longitudinal vehicle axis). The instrumentation stage can include lateral force sensors, longitudinal force sensors, flexures (e.g., isolating force transmitted to the load cell along a single axis; longitudinal flexures, lateral flexures; longitudinal stiffening elements, lateral stiffening elements, etc.), damping elements, rollers (e.g., lateral axis, longitudinal axis, etc.), and/or any other suitable components.

In a first example, the instrumentation stage can include a shear connection at an interior of the stage, and a horizontal retention component encircling the shear connection in a horizontal plane. A load sensor (e.g., load cell, strain gauge, force-torque sensor, etc.) can be arranged between the horizontal retention component and the shear connection and configured to measure (shear) forces transmitted in a first (horizontal) direction. A first set of stiffening elements or flexure elements can be arranged between the shear connection and the horizontal retention component and configured to provide stiffness orthogonal to the first direction (e.g., isolating force transmitted to the load sensor in the first direction). The stage can optionally include a second horizontal retention component encircling the first, along with a second load sensor which is orthogonal to the first and a corresponding set of stiffening elements (e.g., providing stiffening in the first direction; orthogonal flexures).

In a second example, the sensor instrumentation stage substantially isolates force transmission through a first sensor along a longitudinal axis with a flexure (an example is shown in FIG. 8A) or set of orthogonal rollers (an example is shown in FIG. 8B).

In variants, the instrumentation stage can altogether exclude damping elements, or can include damping elements aligned with and/or orthogonal to stiffening elements and/or load sensors.

Additionally or alternatively, instrumentation stages can include integrated inertial sensors (e.g., IMUs, etc.), angular position/velocity sensors (e.g., configured to measure a relative angle between two sides of a fifth wheel coupling at the tractor/trailer interface), and/or any other suitable sensors.

However, the vehicle system can include any other suitable sensor suite.

The vehicle system can include a controller 160 which functions to distribute power within the vehicle system and/or control the electric powertrain. The controller can additionally or alternatively function to implement autonomous vehicle controls (e.g., automatic regenerative braking, longitudinal vehicle control). The controller can include a battery management system (BMS), motor controller (or motor inverter), and/or any other suitable components. The controller can receive sensory inputs/measurements from the sensor suite, which can be used to determine a vehicle state, dynamically control the vehicle system, manage the batteries, and/or control the electric powertrain. The controller can be centralized (e.g., packaged within the chassis and/or mounted thereto; within a single module) or distributed (e.g., across multiple compute nodes, packaged within multiple compute modules, etc.).

The controller can include a battery management system which functions to monitor the battery state, which can include: state of charge (SoC), state of health (SoH), state of power (SoP), state of safety (SoS), temperature (e.g., of the battery or a set of cells therein, a temperature distribution of battery cells, etc.; cooling temperature), and/or any other suitable characteristics. The battery management system can also function to control the charging (e.g., via a charge port; during regenerative braking) and/or discharging (via the electric powertrain) of the battery. However, the controller can include any other suitable BMS.

The controller can include one or more motor controllers which function to condition power from the battery to be supplied to a motor and/or to control electrical propulsion and/or dynamic (regenerative) braking at the motor. There can be a single motor controller associated with the vehicle, one motor controller per motor, and/or any other suitable number of motor controllers. However, the controller can include any other suitable motor controllers.

Figure 3A:
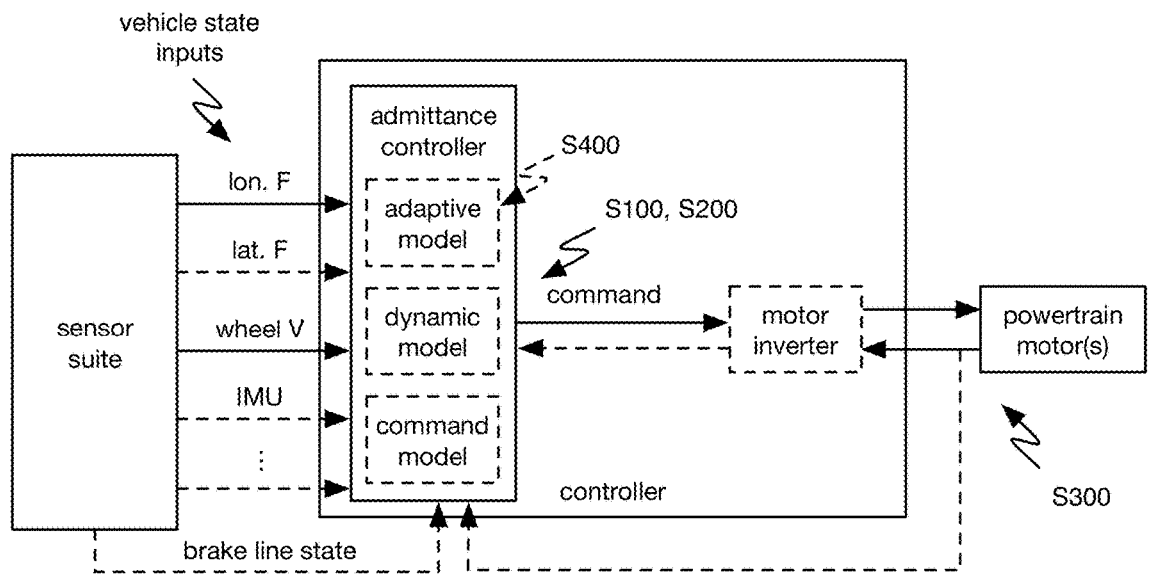
FIG. 3A is a diagrammatic example of a variant of the vehicle system and/or control method.
Figure 6A:
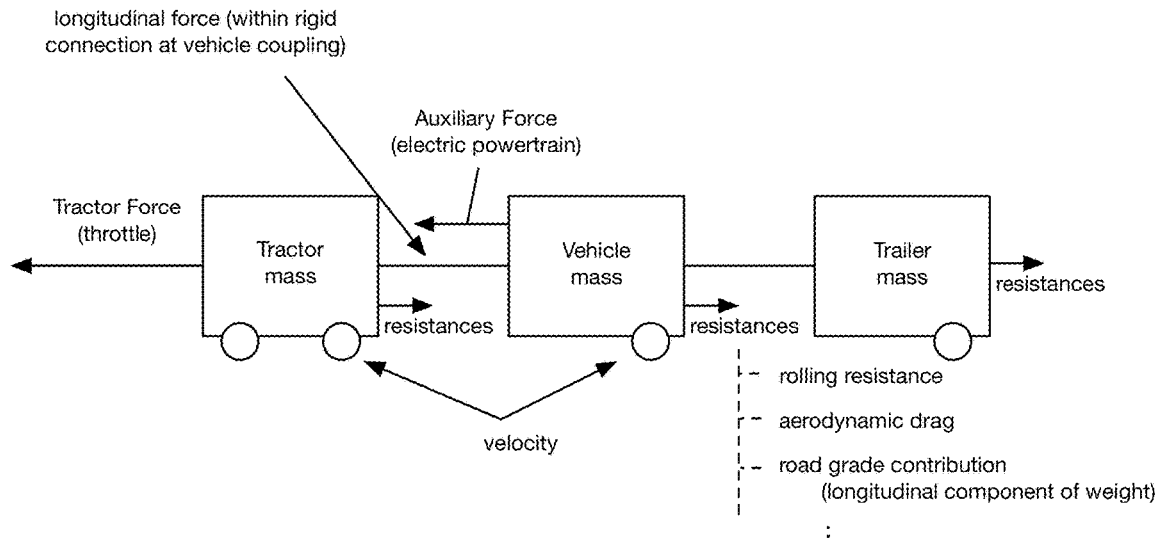
FIG. 6A is a diagrammatic example of a combination vehicle system.

The controller can include and/or function as an admittance controller (e.g., an example is shown in FIG. 3A), which can control the electric powertrain to yield an effective mechanical impedance at the (forward) vehicle coupling (or, inversely, an impedance controller configured to control an effective admittance at the forward vehicle coupling), relative to the vehicle system 100. The admittance controller can include a (dynamic) vehicle model, which functions to models the physical parameters of the combination vehicle system (e.g., an example is shown in FIG. 6A), and can be used to estimate the vehicle trajectory (e.g., in accordance with Block S100) to be used for admittance control.

Figure 6B:
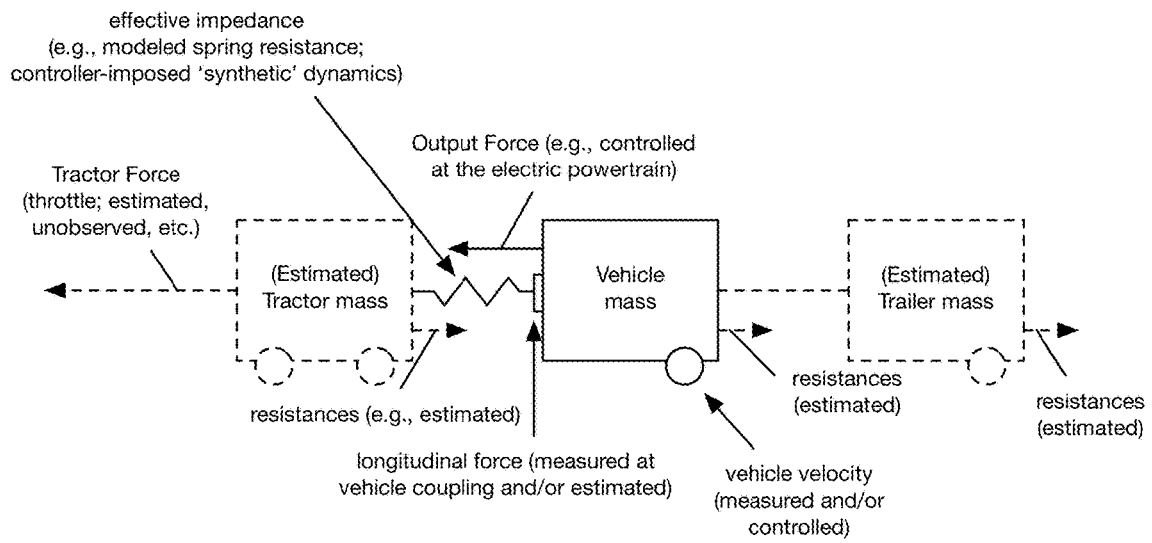
FIG. 6B is a diagrammatic example of a model and/or controller for the vehicle system in FIG. 6A.

The admittance controller can include a command model which functions to establish an effective mechanical impedance relationship (e.g., controller imposed synthetic dynamics) at the front vehicle coupling of the vehicle model (e.g., an example is shown in FIG. 6B). The command model can be integrated into the vehicle model (e.g., integrated with a dynamic vehicle model), separate from the vehicle model, and/or otherwise implemented within the admittance controller. In variants, the command model can implement nonphysical (synthetic) nonlinearities within the effective mechanical impedance relationship to improve the behavioral response and/or sensitivity of the vehicle system in various operating regimes (e.g., braking, coasting, accelerating). More preferably, the command model can implement asymmetric impedance between the braking and accelerating regimes of operation (e.g., where braking is more responsive than acceleration, for example), such as by treating the vehicle mass asymmetrically between the two regimes (e.g., the command model can asymmetrically model the vehicle mass between braking and acceleration, such as by treating the vehicle mass as heavier within the braking regime). The admittance controller can optionally include an adaptive model, which functions to adaptively estimate model parameters (e.g., invariant parameters such as tractor mass and trailer mass; variant parameters such as road grade and wind speed; braking corner point and/or coast regime boundaries, etc.), which can be used to adaptively adjust and/or update the vehicle model and/or the command model. The adaptive model can be integrated into the vehicle model and/or the command model, can be separate from the vehicle model and/or command model, and/or can be otherwise implemented within (or in conjunction with) the admittance controller.

In variants, the controller is autonomous and includes an autonomous admittance controller associated with a nonlinear effective impedance (e.g., nonlinear effective impedance in a braking regime; nonlinear effective impedance in an acceleration regime which is asymmetric with the braking regime; asymmetric effective impedance).

In variants, the admittance controller comprises a dynamic model which includes an adaptive observer, wherein the dynamic model is configured to update the adaptive observer based on a dynamic model error and a vehicle state estimation, and the road grade estimate.

Alternatively, the controller can be inversely configured as an impedance controller and/or function as an impedance controller (e.g., controlling an effective admittance or admittance relationship, etc.). For example, an impedance controller can include a command model which establishes an effective admittance relationship with the same or similar properties (e.g., nonlinear and/or asymmetric effective admittance properties, etc.).

However, the vehicle system can include any other suitable controller.

In variants, the vehicle system can be coupled to a parking brake pneumatic line, dynamic brake pneumatic line, and/or electrical line of the tractor and/or trailer. In a first variant, the vehicle system can include passthrough connections for each tractor/trailer inter-connection. In a second variant, the controller of the vehicle system can selectively boost or decrease one or more passthrough signals (e.g., braking signals; brake light signals) and/or tractor trailer interconnections. In a third variant, the controller can fully decouple interconnections between the tractor and the trailer (e.g., acting as an intermediary or otherwise superseding tractor control inputs). In a fourth variant, one or more tractor/trailer inter-connections can be unused or eliminated (e.g., pneumatic line, electronic signal). As an example, the compressor and/or controller onboard the vehicle system 100 can be used to command all actuators on the vehicle system and/or trailer (e.g., brakes, lift mechanisms, etc.).

In variants, the vehicle system can be configured to receive and/or relay brake light signals between the tractor and the trailer (e.g., via a direct electrical connection), wherein the brake light signal is a binary state (e.g., high/low voltage), wherein the vehicle command is determined based on the binary state. For example, the binary state of the brake light signal can be used to disambiguate between coasting and (light) braking behaviors, both of which may result in compression forces at the vehicle coupling and/or net vehicle decelerations.

However, the vehicle system can include any other suitable components.

4. Method.

The vehicle control method, an example of which is shown in FIG. 1, can include: determining a vehicle state based on a set of vehicle state inputs S100; determining a command based on the vehicle state S200; and controlling the vehicle according to the command S300. The method can optionally include updating a vehicle model based on a control outcome S400. However, the method S100 can additionally or alternatively include any other suitable elements. The method can function to determine longitudinal vehicle control based on a set of vehicle state inputs (e.g., a limited set of inputs—such as without direct knowledge of a throttle input, etc.). Additionally or alternatively, the vehicle control method can function to infer driving intent based on vehicle state measurements and/or translate inferred driving intent into low-latency vehicle control. Additionally or alternatively, the system can function to autonomously augment longitudinal propulsion, autonomously augment vehicle braking, and/or facilitate autonomous (longitudinal) vehicle control.

The vehicle control method and/or individual elements thereof are preferably performed iteratively (e.g., during a vehicle drive cycle), but can additionally or alternatively be performed: in response to satisfaction of a control condition (e.g., detection of a vehicle trip and/or initial estimation of model parameters according to S400; receipt of an initiation command from a driver, such as via a wireless communication; satisfaction of a speed threshold, etc.), periodically, aperiodically (e.g., during operation of a combination vehicle system), once, repeatedly, and/or with any other suitable frequency/timing. Method elements can be performed synchronously, contemporaneously (e.g., with a common time interval, with different intervals), asynchronously, sequentially/serially, iteratively, and/or with any other suitable timing/relationship.

Determining a vehicle state based on a set of vehicle state inputs S100 functions to determine an input(s) (e.g., trajectory) to be used for command/control of the vehicle. Additionally or alternatively, the S100 can function to determine a trajectory which can function to infer or represent the driver's intent. The vehicle state can include an initial condition or 'snapshot' of vehicle parameters (e.g., vehicle state parameters, environment state parameters—such as road grade or bank angle, etc.) at a single point in time (or time single time window, such as a measurement sampling interval), such as a current time (or current sampling interval). Additionally or alternatively, vehicle state can include a trajectory which estimates vehicle state parameters as a function of time (e.g., simulated over a time interval, such as the expected velocity change over a simulation period; feedforward estimate of the vehicle parameters based on a current vehicle command, etc.). As a first example, the trajectory can include: a longitudinal velocity component and/or a prediction of the longitudinal velocity as a function of time (e.g., over a predetermined duration) given the current vehicle state. As a second example, the trajectory can include a longitudinal force (e.g., estimated and/or measured) at a vehicle coupling (e.g., tractor interface, such as a kingpin; force component aligned with the direction of tractor and/or trailer motion) and/or a prediction of the longitudinal force as a function of time.

The vehicle state inputs of S100 can include current and/or historical measurements (e.g., stored at and/or retrieved from a local memory) from sensors of the sensor suite, which can include measurements of: linear motion (e.g., position, velocity, acceleration, jerk, etc.; of a vehicle mass such as the tractor, sixth wheel vehicle system, trailer, full dynamic system, etc.), rotary motion (e.g., angle, angular velocity, angular acceleration, etc.; wheel position; wheel speed; etc.), inertia (e.g., via IMU, INS, gyroscopes, magnetometers, etc.), force (e.g., longitudinal, lateral, vertical, etc.), torque (e.g., motor torque, pitch axis torque, yaw axis torque, roll axis torque, etc.), (trailer) brake line pressure, brake light signal state (e.g., binary; high/low), and/or any other suitable vehicle state measurements. In a specific example, the vehicle state inputs can include inertial measurements (e.g., from an IMU), force measurements (e.g., at a tractor interface), and wheel position and/or velocity measurements (e.g., from an encoder or resolver). In variants, vehicle state measurements can be fused across multiple data sources and/or sinks (e.g., to improve accuracy, reliability, fault tolerance, redundancy, etc.). In variants, vehicle state measurements can be filtered (e.g., to reduce noise, etc.) or unfiltered. In some variants, the vehicle state inputs can additionally include prior trajectory estimates, commands, and/or control feedback from previous iterations of the method (e.g., to facilitate feedback control and/or loop closure). However, the trajectory can be determined from any suitable set of measurement inputs.

The vehicle state preferably includes a trajectory which is preferably determined from the vehicle state inputs using a vehicle model, such as a dynamic model. The dynamic model can be predetermined for a particular vehicle configuration (e.g., human pull assist, no trailer, attached trailer) and/or adjusted/adapted based on a particular vehicle configuration (e.g., according to S400; tuned parameters such as: tractor mass, a set of aerodynamic constants, a set of rolling resistances, trailer mass, etc.). In a specific example, the dynamic model can be determined and/or updated (e.g., in accordance with S400) during operation of a combination vehicle during a trip, such as in response to a determination that the vehicle is driving on a new trip or driving cycle and/or a determination that the vehicle configuration has changed. For example, in a combination vehicle system (e.g., an example is shown in FIGS. 6A-B), the tractor mass, trailer mass, and/or resistance coefficients (e.g., rolling resistance, aerodynamic resistance, etc.) may be invariant parameters which are extrinsic to the vehicle system 100, but may change between vehicle configurations, trips, and/or driving cycles (e.g., such as when a trailer is loaded/unloaded, when the vehicle is disconnected from a first tractors and connected to a second tractor, when a trailer is disconnected, etc.). Alternatively, the parameters of the vehicle model can be predetermined/fixed (e.g., where the mass of the tractor is held fixed, etc.), and/or otherwise determined. Accordingly, the vehicle model can include and/or incorporate: a set of predetermined parameters (e.g., intrinsic/invariant parameters, vehicle mass of the vehicle system 100), a set of extrinsic parameters (e.g., dependent on vehicle configuration and/or environmental parameters), a set of invariant parameters (e.g., extrinsic, such as tractor mass and/or trailer mass; intrinsic; etc.), a set of environmental parameters (e.g., wind speed/direction, bank angle, road grade, etc.), a set of variant/changing parameters (e.g., environmental parameters), vehicle command parameters, and/or any other suitable parameters. In variants, the extrinsic parameters vehicle model can be adaptively determined and/or updated in accordance with S400: once (e.g., at a start of a vehicle trip or drive cycle), dynamically, periodically, repeatedly, contemporaneously with controlling the vehicle (and/or during a drive cycle), and/or with any other suitable timing/frequency.

In a first variant, the vehicle model can include a dynamic model with precomputed trajectories for a (finite) set of vehicle state inputs and/or vehicle parameters, such as in the form a lookup table (e.g., where the trajectory can be interpolated between lookup table entries, for example). In a second variant, the vehicle model can include a kinematic model and/or kinematic linearization of vehicle dynamics, which can be used to estimate the vehicle state and/or trajectory (e.g., in real time or substantially in real time, etc.). In a third variant, a subset of trajectory parameters can be directly/empirically measured with sensors of the sensor suite (e.g., load cell or force sensing at the forward vehicle coupling, wheel speed sensors, etc.). In a fourth variant, the vehicle model can be used to dynamically predict or simulate the trajectory as a function of time. In a specific example, the vehicle model can include an adaptive vehicle model (e.g., an adaptive observer), wherein the dynamic model is configured to update the adaptive observer based on a dynamic model error (e.g., based on a vehicle state estimation and a road grade estimate).

In variants, the dynamic model can include and/or be used in conjunction with a road grade estimator (e.g., road grade value estimate), which can be used to estimate a longitudinal component of vehicle weight within the dynamic model. The road grade can be estimated based on historical inertial data (e.g., AHRS inclinometer, accelerometer/gyroscopes data, etc.), localization data (e.g., GPS; with or without prior terrain maps), and/or other suitable data sources. Additionally or alternatively, road grade estimation can be adaptively estimated within the dynamic model (e.g., as an adaptive parameter), and/or can be otherwise estimated.

However, the vehicle state and/or a trajectory thereof can be determined using any other suitable vehicle model(s).

The vehicle state and/or a trajectory thereof can be determined: continuously (e.g., in real time), periodically (e.g., 1 Hz, 10 Hz, 100 Hz, etc.), aperiodically, in response to a change in one or more state parameters (e.g., change in longitudinal force at the tractor interface, in response to a change in brake line pressure, etc.), and/or with any other suitable timing/frequency. The trajectory is preferably determined autonomously/automatically by controller of the vehicle system, but can alternatively be received from a remote computing system (e.g., onboard the tractor, trailer, or secondary vehicle system), and/or otherwise suitably determined.

In an example, the trajectory can be determined for the set of vehicle state inputs using a vehicle model (e.g., including a set of invariant vehicle parameters and/or constraints) in conjunction with an adaptive model (e.g., kernel; such as may be determined and/or refined according to S400) which specifies a set of parameters for the vehicle and/or current configuration of the vehicle. In such cases, the dynamic model can simulate the dynamics of the vehicle (e.g., trajectory) for configuration specific vehicle parameters including: aerodynamic coefficients, rolling resistance coefficients, vehicle mass, trailer mass, tractor mass, coast regime boundary parameters/coefficients (e.g., relating the force at the tractor interface as a function of velocity when the tractor throttle is disengaged and/or when the engine is in an idle state), and/or any other suitable parameters. The vehicle model can additionally or alternatively simulate the trajectory as a function of various environmental parameters (e.g., which can be extracted from sensor suite and/or estimated), such as: road grade, road bank angle, wind speed/direction, and/or any other suitable environmental parameters and/or external (varying) parameters.

In an example, the trajectory can include a velocity estimate based on the vehicle velocity (e.g., measured at the wheels) and a force measurement (e.g., at the kingpin/tractor interface).

In an example, the trajectory can include a coast regime parameter estimate based on the current vehicle state (e.g., generated based on an adaptive model), which can be used to determine a velocity command in S200.

However, any other suitable vehicle state and/or trajectory can be determined.

Figure 7:
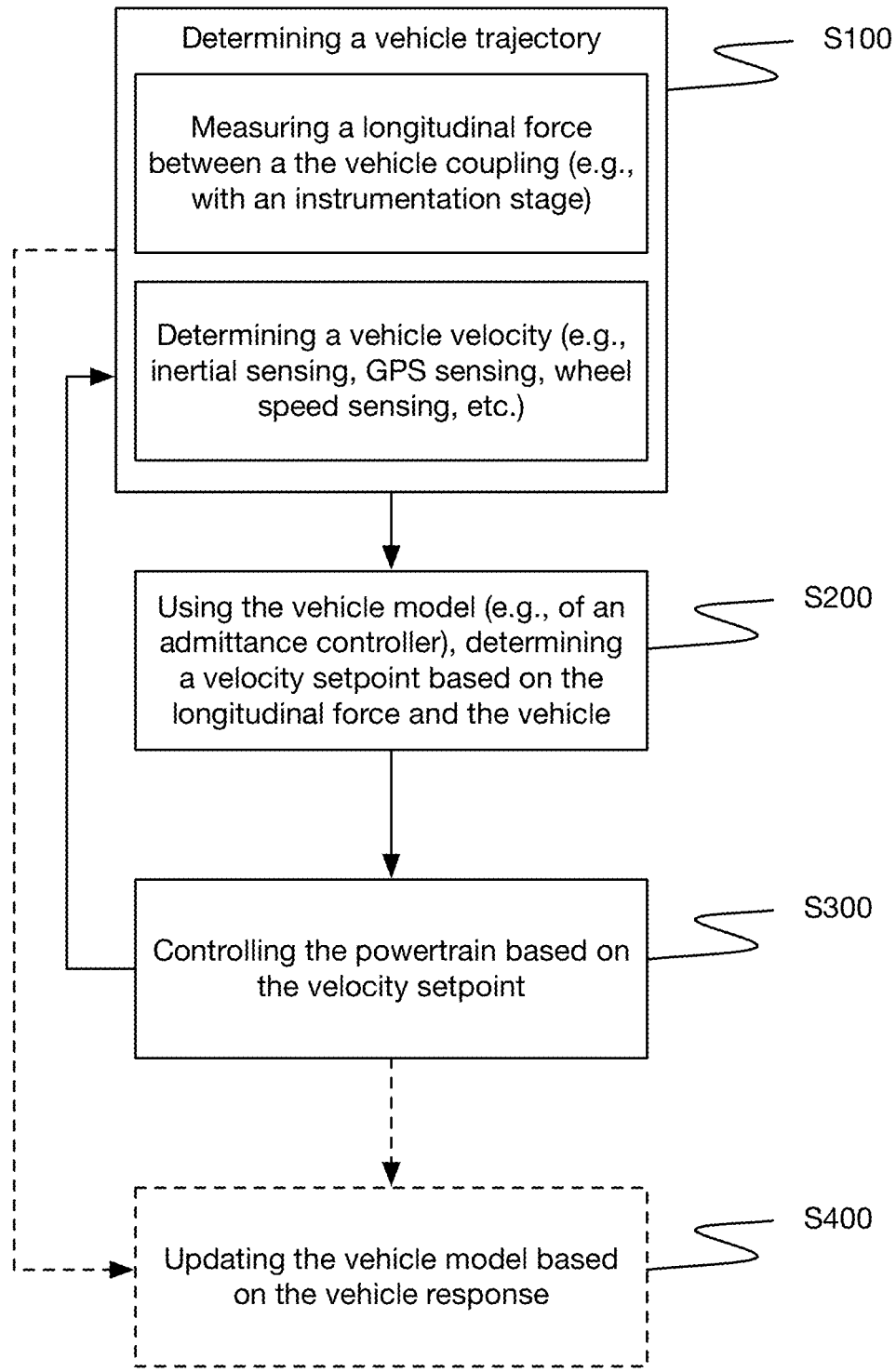
FIG. 7 is a flowchart diagram of a variant of the method.

Determining a command based on the vehicle state S200 functions to determine commands (e.g., motor velocity, motor torque, brake pressure, etc.) for the vehicle system and/or powertrain. Additionally or alternatively, S200 can function to implement one or more control laws, such as to remove ambiguity from the vehicle state and/or a trajectory thereof (e.g., the system can infer a driver intent to decelerate when an increase in brake pressure is detected). The commands are preferably decoupled from driver inputs (e.g., not directly determined from driver inputs), but can alternatively be directly derived from driver inputs. Commands can serve as inputs for actuator controllers (e.g., motor driver/inverter, independent brakes, etc.), and can include: a target/setpoint for an actuator (e.g., single value, time-correlated profile, etc.; motor velocity, motor torque, actuator position, etc.; an example is shown in FIG. 7), binary input (e.g., emergency brake: ON), and/or any other suitable control input(s). The command can be determined based on the trajectory, a subset of the trajectory parameters, a predicted trailer response, and/or based on any other suitable input.

Figure 3B:
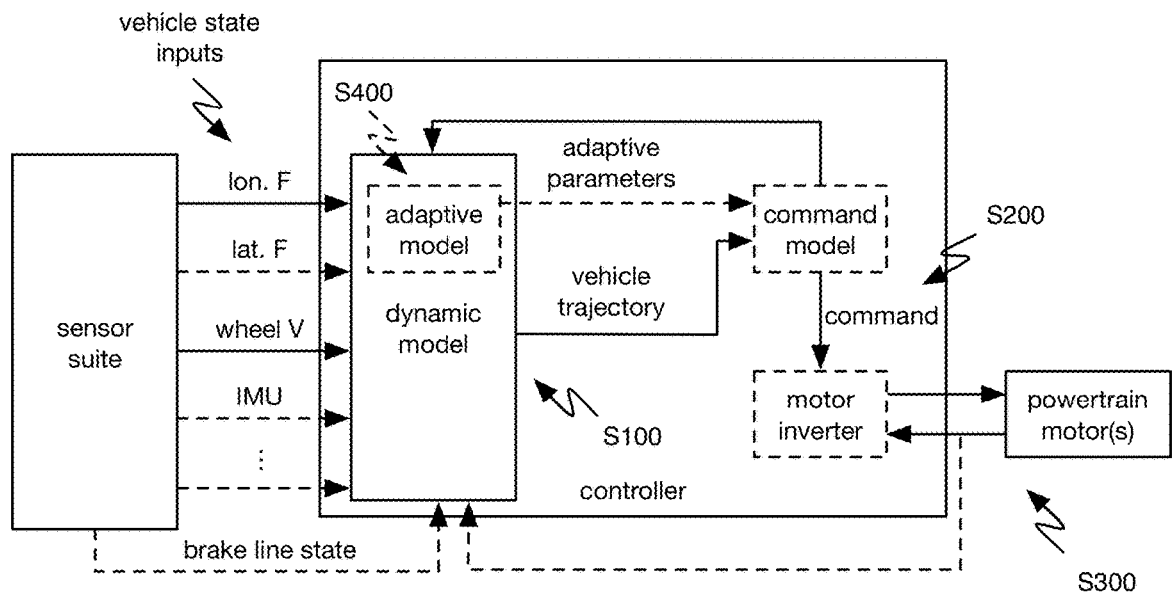
FIG. 3B is a diagrammatic example of a variant of the vehicle system and/or control method.

In a first set of variants, commands can be determined using a command model, which can generate one or more commands (outputs) using the trajectory as an input (e.g., an example is shown in FIG. 3B). The command model can be a lookup table, a function (e.g., mapping one or more trajectory parameters to a set of control values/targets, linear, non-linear), a neural model, a tree-based model (e.g., decision tree; binary classifier), heuristic model, a regression model, a neural network model (e.g., DNN, CNN, RNN, etc.), a cascade of neural networks, compositional networks, Bayesian networks, Markov chains, probabilistic graphical models, and/or other model(s). In a some variants, the command model includes an impedance model/filter, which transforms a trajectory (or a subset of parameters therein, such as an inferred acceleration) into a velocity setpoint command for a motor inverter. In a specific example, the command model can be employed in a control scheme (e.g., an adaptive control scheme), adjusting based on the instantaneous and/or accumulated velocity error (e.g., proportional controller, PI controller, PID controller, nonlinear controller, piecewise linear controller, etc.). Alternatively, the command model includes an admittance model/filter, which transforms a trajectory into a force (or torque) setpoint command, tracking the force at the forward vehicle coupling and/or force/torque at the powertrain (with a force/torque setpoint, for example). In a specific example, the command model can be employed in a control scheme (e.g., an adaptive control scheme), adjusting based on the instantaneous and/or accumulated force/torque error (e.g., proportional controller, PI controller, PID controller, nonlinear controller, piecewise linear controller, etc.) at the forward vehicle coupling and/or powertrain.

Figure 4A:
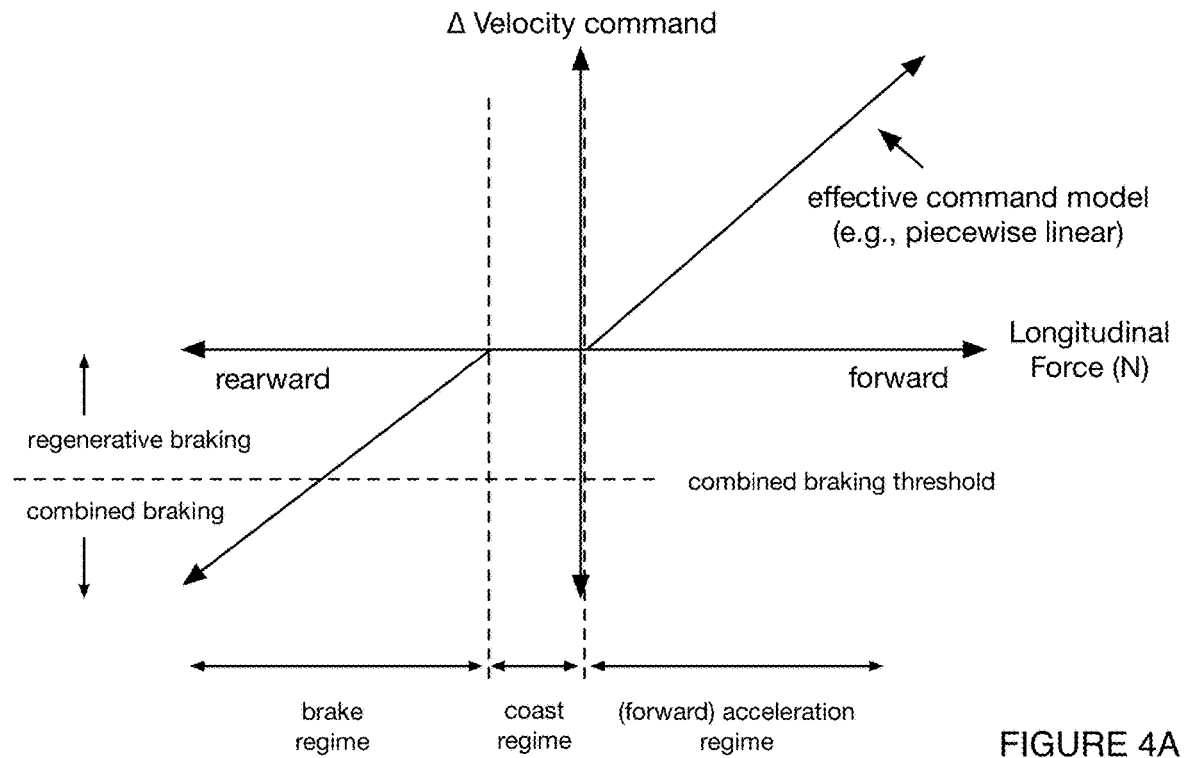
FIG. 4A-B are a first and second example mapping between force and commanded velocity in one or more variants of the method.
Figure 4B:
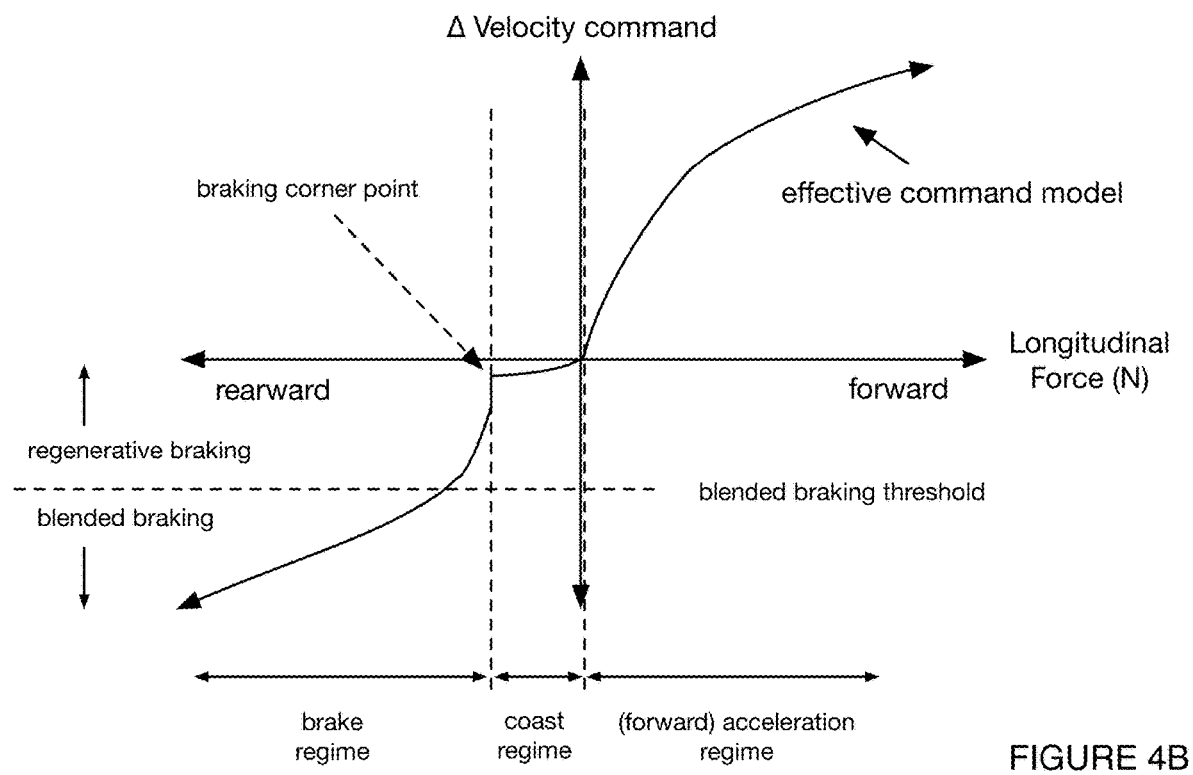

The command model can function to generate an effective mechanical impedance (e.g., effective spring) and/or other 'synthetic' dynamics (e.g., relative to the dynamic model, effective admittance) of within combination vehicle system (e.g., an example is shown in FIG. 6B). The effective mechanical impedance and/or other synthetic dynamics can be linear (e.g., entirely linear, piecewise linear, such as in the example shown in FIG. 4A), non-linear (e.g., an example is shown in FIG. 4B), symmetric, asymmetric, and/or otherwise configured. More preferably, the command model is asymmetric and/or generates an asymmetric effective impedance (e.g., between positive/negative changes in velocity and/or forward/rearward forces at the vehicle coupling). For example, the command model and/or effective mechanical impedance (or, inversely, admittance) can impose synthetic (non-physical) non-linearities in the dynamic behavior of the combination vehicle system, which may improve the vehicle responsiveness and/or driving feel in various operational regimes. For instance, it can be advantageous for the vehicle to respond more rapidly to braking (e.g., higher effective spring constant) than forward accelerations.

Additionally, the effective mechanical impedance (and/or vehicle responsiveness) can be configured to track a synthetic coasting behavior (e.g., with the engine in idle, when the throttle and brakes are disengaged) and/or otherwise not affect vehicle coasting behaviors. For example, a common driver behavior may be to coast the vehicle when the driver is unsure if they will need to accelerate or brake, and, in such circumstances, it may be advantageous to preserve the natural vehicle dynamics and/or a provide a tractable vehicle behavior (e.g., where the driver intent is ambiguous).

In some variants, the command model can include a brake regime, a (forward) acceleration regime (a.k.a., throttle regime), and a coast regime between the brake regime and the throttle regime, wherein the effective mechanical impedance of the command model is asymmetric between the brake regime and the acceleration regime (e.g., an example is shown in FIG. 4B). For example, the effective impedance proximal to braking corner point (e.g., at a boundary between the coast regime and the brake regime) can be greater than an effective impedance of the acceleration regime (e.g., proximal to the transition between the coast regime and the acceleration regime; for small forward/tensile forces).

Synthetic (non-physical) nonlinearities can be included within the command model in the form of: asymmetric mass coefficients/offsets (e.g., treating the net vehicle mass of the combination vehicle as larger within the brake regime), nonlinearities in command model function, nonlinearities in an impedance coefficient, and/or in any other suitable forms (e.g., it is understood in the field of endeavor that various mathematical operations, adjustments, or offsets may be equivalently employed to achieve equivalent or substantially equivalent nonlinear effects in the command model).

In a second set of variants, nonexclusive with the first set, commands can be adjusted according to a set of control laws/heuristics. Control laws can include road grade mitigation control (e.g., counteracting gravity in the controller, removing 'hills'), stability control (e.g., engaging trailer brakes and shifting the center of drag rearwards in response to detecting satisfaction of an instability event), braking control (e.g., determining negative acceleration based on a brake line pressure, such as to preserve and/or improve braking responses; reducing trailer braking while simultaneously increasing regenerative braking; increasing braking sensitivity; antilock braking; etc.), loss nullification control (e.g., remove dynamic effects in front of vehicle, such as rolling resistance, aerodynamic losses, etc.), and/or any other suitable control laws can be employed.

In an example, road grade mitigation control can include: estimating a road grade (e.g., as part of the vehicle state and/or trajectory), estimating a velocity contribution of the road grade, and adjusting the command to counteract the velocity contribution (e.g., adjusting the error gain of a proportional velocity controller based on the road grade velocity contribution).

In a second example, anti-lock braking control can activate an anti-lock braking command/behavior in response to satisfaction of a wheel slip condition (e.g., a wheel speed error and/or powertrain output error in excess of a threshold, etc.). Additionally or alternatively, braking control can include: adjusting a trailer brake pressure (e.g., pneumatic actuation commands) and/or offsetting a trailer brake pressure based on a regenerative braking command (e.g., to balance braking contribution between the vehicle system and the trailer, etc.).

In variants, the command model can be predetermined and/or fixed to facilitate tractive vehicle control behavior in a variety of operational contexts (e.g., varying vehicle configuration, varying environmental parameters, etc.), but can additionally or alternatively be adapted based on the dynamic model, adjust command generation based on various vehicle model parameters and/or trajectory parameters, and/or otherwise adaptively generate commands based on the operational context. For example, the command model can be adjusted/varied as a function of control regime boundaries (e.g., coast regime boundaries; braking corner point), such as by a predetermined relationship or function. As a second example, the command model can yield repeatably transform a set of input parameters (e.g., vehicle model parameters and trajectory parameters) into a single (i.e., repeatable) vehicle command output.

Figure 9:
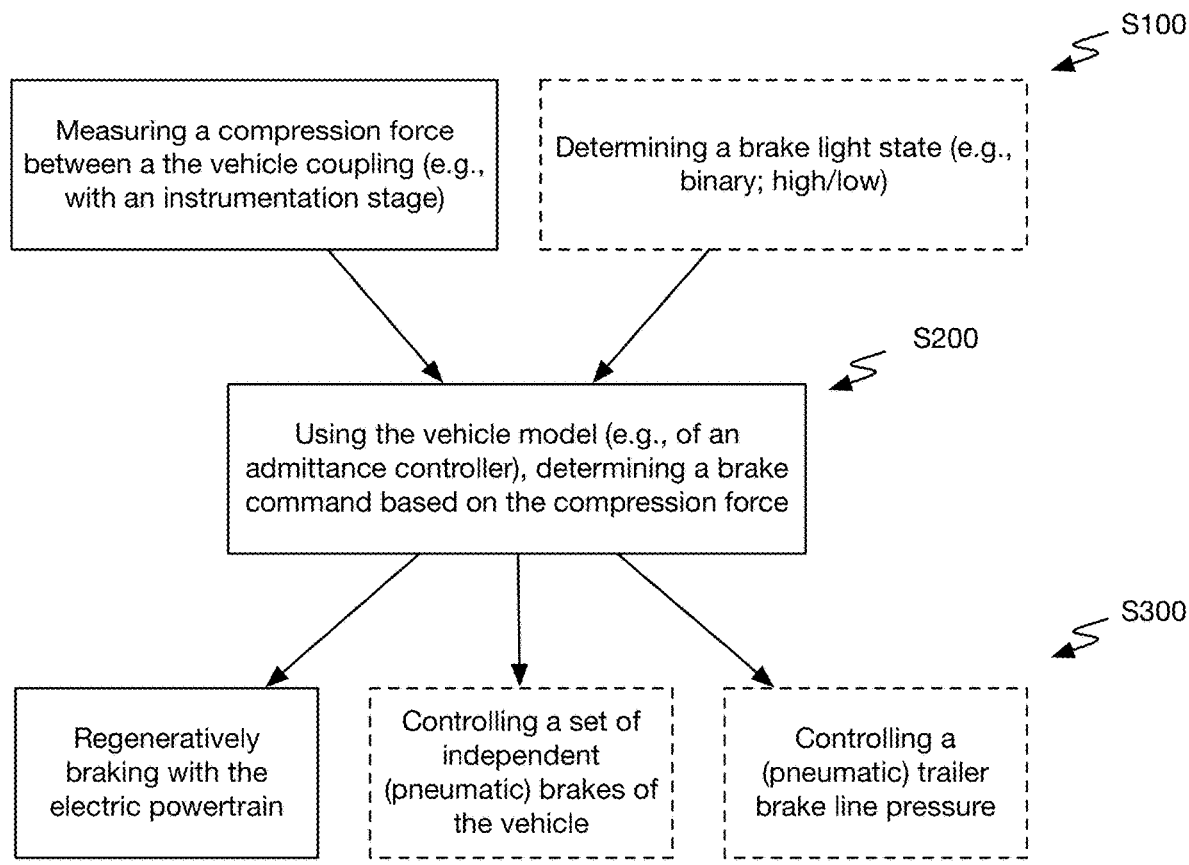
FIG. 9 is a flowchart diagram of a variant of the method.

In variants, vehicle commands and/or an operational regime can optionally be determined based on a brake light signal and/or binary brake state (e.g., associated with the brake light signal; an example is shown in FIG. 9), which can disambiguate whether the between coasting and braking regimes. For example, at the braking corner point, the command model can include a piecewise transition in the velocity command (e.g., based on the binary brake state; an example is shown in FIG. 4B). Additionally or alternatively, the vehicle command may be strictly limited to a braking regime based on the binary brake state (e.g., when the vehicle is braking), and/or may otherwise depend on the brake light signal. Alternatively, the brake light signal or a brake state derived therefrom can be used to estimate the braking corner point and/or the coast regime boundary (e.g., in S400) to indirectly affect command generation, or may not be used for command generation in S200.

However, commands can be otherwise suitably determined based on the trajectory.

Controlling the vehicle according to the command S300 functions to affect motion of the vehicle system (e.g., inferred based on the trajectory) by supplying power to the powertrain and/or actuation mechanisms therein. In a first variant, S300 includes powering the electric motor(s) of the vehicle system in a velocity-control configuration (e.g., "pushing" the tractor and/or "pulling" trailer mass at the respective interfaces). In a second variant, S300 can include regeneratively braking the vehicle system at the electric powertrain. In a third variant, S300 can include braking the vehicle system, such as by actuating a set of frictional brakes of the vehicle system, changing a pressure of a trailer brake line (e.g., boosting brake line pressure, reducing brake line pressure).

In a first variant, the vehicle system can impart force (longitudinally) in the direction of vehicle motion in a default and/or nominal operating state (e.g., constant speed, cruise condition of the vehicle), such as a force substantially equal to the resistance of the trailer and/or tractor (e.g., under the influence of gravity—such as may have a "smoothing" effect when traversing hilly terrain).

In a second variant, the vehicle system can resist forward motion (e.g., at the tractor interface, at the trailer interface) of the vehicle during a braking event (e.g., in response to detecting a rearward force in excess of a coast regime threshold at the tractor interface; in response to detecting a threshold pressure in a trailer brake line).

In a third variant, the vehicle system can regeneratively brake to eliminate the effects of road grade in excess of a predetermined threshold (e.g., prevent acceleration of a vehicle at highly negative road grades where a longitudinal component of weight vector outweighs motion-dependent resistances, such as: rolling resistance and aerodynamic losses).

S300 is preferably executed by a motor controller (e.g., motor inverter therein) and/or an actuator driver, but can be otherwise suitably executed. Motor controllers can be employed within any suitable control schemes, such as: feedforward control, feedback controls, linear control scheme, non-linear control, vector control (FOC/VFD), and/or any other suitable control schemes. In variants, the vehicle model and/or an admittance controller (e.g., generating commands which are executed at S300) can include feedforward and/or feedback terms to improve tracking performance.

In variants, S300 can include regenerative braking and/or performing blended braking (e.g., a combination of regenerative braking and actuation of a set of independent vehicle brakes; an example is shown in FIG. 9) based on the command. For example, S300 can include blended braking in response to a determination that a vehicle command exceeds a blended braking condition (e.g., predetermined threshold and/or dynamically threshold as a function of trajectory; based on vehicle command, etc.). As an example, the set of actuators can include an electric powertrain (e.g., including a traction motor) and a set of independent brakes of the vehicle system, wherein the vehicle command comprises a blended braking command associated with the traction motor and the set of independent brakes, wherein determining the vehicle command based on the vehicle trajectory comprises: determining the blended braking command based on the longitudinal force satisfying a compression threshold (e.g., wherein S300 includes controlling the set of actuators based on the blended braking command). However, the vehicle system can alternatively always perform blended braking or can be configured to operate without blended braking (e.g., only pneumatic braking; only regenerative braking).

However, the vehicle can be otherwise suitably controlled.

Optionally updating a vehicle model based on a control outcome S400 functions to refine an estimate of one or more model parameters (e.g., of the vehicle model and/or command model). In a first variant, the vehicle model can be an adaptive model which is refined for one or more parameters within the vehicle model, such as: vehicle masses (e.g., tractor mass), rolling resistance, aerodynamic resistance, transmission losses, coasting parameters, and/or any other suitable parameters. In an example, vehicle parameters can be estimated for the dynamic model by backpropagating errors to refine a gradient estimator (e.g., within a stochastic gradient descent optimization). In a second variant, one or more parameters of the vehicle model can be directly measured (e.g., at a start of a trip) and/or estimated at the initiation of a drive cycle (e.g., based on a previous drive cycle; without subsequent modification; with subsequent refinement). However, vehicle parameters can be otherwise suitably determined.

Vehicle models can be updated prior to a drive cycle, during a drive cycle, periodically, continuously, repeatedly, in response to error exceeding a threshold, and/or with any other suitable frequency/timing.

In variants, S400 can include estimating invariant extrinsic parameters of the vehicle model for a particular vehicle trip and/or drive cycle (e.g., estimated tractor mass, estimated trailer mass, etc.). For example, the trailer brake line pressure and/or a longitudinal force sensor (e.g., load cell) at a rear vehicle coupling can be used to facilitate separate estimation of tractor mass and trailer mass in S400. In an example, wherein the dynamic model includes a first set of invariant intrinsic parameters and a second set of invariant extrinsic parameters, S400 can include (e.g., in response to autonomously detecting a vehicle trip with the vehicle sensor suite) dynamically estimating values of each invariant extrinsic parameter of the second set of invariant extrinsic parameters for the vehicle trip based on the longitudinal force at a vehicle coupling (e.g., front vehicle coupling). Additionally or alternatively, estimation of the invariant extrinsic parameters can be based on current and/or historical vehicle state inputs of: longitudinal force at a second vehicle coupling (e.g., rear vehicle coupling), vehicle velocity (e.g., wheel speed velocity), trailer brake line pressure, motor control feedback (e.g., powertrain output), inertial data, and/or any other suitable inputs.

In variants, a pneumatic brake line of the vehicle system can be configured to fluidly connect to a tractor brake line at a first end and a trailer brake line at a second end, wherein the vehicle sensor suite comprises a brake line sensor, wherein the autonomous controller is configured to dynamically estimate a set of invariant extrinsic parameters (e.g., tractor mass and/or trailer mass) based on a set of trailer braking measurements from the brake line sensor.

In variants, updating a vehicle model according to S400 can be used to estimate boundaries of a coast regime (e.g., deadband; low impedance regime; etc.) for a particular vehicle configuration during a drive cycle operation (e.g., while controlling the vehicle). A coast regime can function to provide a separation between a braking control regime (commanding a velocity below the current velocity and/or negative longitudinal acceleration) and an acceleration control regime (commanding a velocity above the current velocity and/or positive longitudinal acceleration), which can reduce the sensitivity of the system to a driver disengaging the throttle (and/or transitioning between a throttle and a brake). In particular, the 'idle state' or 'coasting' driving pattern (i.e., where are driver is neither engaging the throttle or the brake) may be regarded as an ambiguous state, since it can commonly occur prior to both acceleration and deceleration events (e.g., a driver may remove their foot from the gas because they aren't sure if they want to brake, because they are about to go down a hill, because they are trying to decide what to do, etc.). Accordingly, minimizing the sensitivity of the system to these 'idle states' can improve the driving feel of the full vehicle system.

The boundaries of the coast regime can vary a function of: vehicle speed, transmission losses (e.g., related to current gear, engine load, etc.; which can be estimated by an adaptive model), aerodynamic losses, rolling resistance, vehicle mass, tractor mass, and/or any other suitable parameters. Accordingly, the coast regime boundary can be estimated within a trajectory based on the adaptive vehicle model (e.g., as provided in S100), and can be included as a parameter used by the command model to determine commands (e.g., in S200). In variants, the braking corner point (e.g., at the coast regime boundary at the transition between coasting and braking; an example is shown in FIG. 4B) can be estimated based on the receipt of a brake light signal (e.g., a binary brake state). As an example, this signal may be available as a vehicle state input even in circumstances where the vehicle system is not communicatively connected to the tractor CAN bus and/or where the vehicle system does not directly receive braking/throttle inputs from the tractor (e.g., an example is shown in FIG. 2). Accordingly, the vehicle model can adaptively estimate this transition point as an element of the vehicle model (e.g., as a function of various model parameters, based on a vehicle state history, etc.).

The coast regime boundaries can be adaptive parameters of the vehicle model and/or can be provided to the command model to facilitate command determination based on the trajectory (e.g., used for heuristic decision making; used to shift/adjust the effective impedance associated with the of the command model, etc.).

However, the vehicle model can be otherwise updated. Additionally or alternatively, the vehicle model can be predetermined, static, deterministic, and/or any other suitable vehicle model can be employed.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A road vehicle system for autonomous augmentation of a combination vehicle system comprising a tractor and a trailer, the road vehicle system comprising:
    a chassis defining a longitudinal axis;
    a first vehicle coupling configured to connect to the tractor and mounted at a forward end of the chassis relative to the longitudinal axis;
    an electric powertrain, comprising:
        a battery mounted to the chassis; and
        a traction motor;
    a vehicle sensor suite comprising a first sensor coupled to the first vehicle coupling and configured to measure a longitudinal force between the first vehicle coupling and the chassis; and
    an autonomous controller configured to:
        based on the longitudinal force, determine a vehicle trajectory with a dynamic model, the dynamic model comprising: a road grade estimate and an adaptive observer, wherein the dynamic model is configured to update the adaptive observer based on a dynamic model error, a vehicle state estimation, and the road grade estimate;
        with a command model, determine a command based on the vehicle trajectory; and
        control the electric powertrain based on the command.

2. The road vehicle system of claim 1, further comprising: a second vehicle coupling mounted to the chassis rearward of the forward end relative to the longitudinal axis, the second vehicle coupling configured to connect to the trailer.

3. The road vehicle system of claim 1, wherein the first sensor is integrated into an instrumentation stage which isolates force transmission along the longitudinal axis with a set of orthogonal rollers or a flexure.

4. The road vehicle system of claim 1, further comprising a charge port configured to supply electrical energy to the battery.

5. The road vehicle system of claim 1, wherein the first sensor comprises a load cell or a strain gauge.

6. The road vehicle system of claim 1, wherein the dynamic model comprises a first set of invariant intrinsic parameters and a second set of invariant extrinsic parameters; wherein the autonomous controller is further configured to: autonomously detect a vehicle trip with the vehicle sensor suite; and dynamically estimate values of each invariant extrinsic parameter of the second set of invariant extrinsic parameters for the vehicle trip based on the longitudinal force.

7. The road vehicle system of claim 6, wherein the second set of invariant extrinsic parameters comprise: a trailer mass and a tractor mass; wherein the first set of invariant intrinsic parameters are predetermined.

8. The road vehicle system of claim 7, further comprising: a pneumatic brake line configured to fluidly connect to a tractor brake line at a first end and a trailer brake line at a second end, wherein the vehicle sensor suite comprises a brake line sensor, wherein the autonomous controller is configured to dynamically estimate the second set of invariant extrinsic parameters based on a set of trailer braking measurements from the brake line sensor.

9. The road vehicle system of claim 1, wherein the autonomous controller comprises an admittance controller.

10. The road vehicle system of claim 1, wherein the command comprises a velocity reference.

* * * * *